US008963700B2

(12) United States Patent
Tanaka et al.

(10) Patent No.: US 8,963,700 B2
(45) Date of Patent: *Feb. 24, 2015

(54) AIR PRESSURE MANAGEMENT DEVICE FOR VEHICLE TIRE AND VEHICLE TIRE CAPABLE OF OUTPUTTING AIR PRESSURE INFORMATION

(71) Applicant: Rohm Co., Ltd., Kyoto (JP)

(72) Inventors: Masahide Tanaka, Kyoto (JP); Yasuhiro Yoshikawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,426

(22) Filed: May 10, 2013

(65) Prior Publication Data
US 2013/0241723 A1  Sep. 19, 2013

Related U.S. Application Data

(63) Continuation of application No. 12/859,438, filed on Aug. 19, 2010, now Pat. No. 8,456,291.

(30) Foreign Application Priority Data

Aug. 21, 2009  (JP) ................................ 2009-192473

(51) Int. Cl.
B60C 23/02 (2006.01)
B60C 23/04 (2006.01)

(52) U.S. Cl.
CPC ........... B60C 23/041 (2013.01); B60C 23/0408 (2013.01)
USPC ...... 340/426.33; 340/442; 340/447; 701/29.7

(58) Field of Classification Search
USPC .............. 340/870.3, 870.39, 526, 527, 539.1, 340/693.1, 693.3, 426.33, 442, 445, 447; 701/1, 36, 29.1, 29.7, 30.3, 30.4, 33.4, 701/34.4
See application file for complete search history.

(56) References Cited

U.S. PATENT DOCUMENTS 6,243,007 B1  6/2001  McLaughlin et al.
6,359,556 B1  3/2002  Katou
(Continued)

FOREIGN PATENT DOCUMENTS

JP  2006-69413    3/2006
JP  2007-196834   8/2007
(Continued)

OTHER PUBLICATIONS

Naruse et al., "Electrostatic micro power generation from low-frequency vibration such as human motion", J. Micromech. Microeng., pp. 1-5 (Aug. 2009).

Primary Examiner — Ryan Johnson
(74) Attorney, Agent, or Firm — Fish & Richardson P.C.

(57) ABSTRACT

A wireless communication device includes an electric power generation unit, an electric power accumulation unit, a sensor supplied with the electric power from the electric power accumulation unit, and a wireless communication unit supplied with the electric power from the electric power accumulation unit, for transmitting the sensed information outputted by the sensor to outside of the wireless communication device. A storage unit stores the sensed information outputted by the sensor. A control unit controls operation of the wireless communication unit, the sensor and/or the storage unit in accordance, at least in part, with the electric power accumulated in the electric power accumulation.

4 Claims, 8 Drawing Sheets

(56) References Cited

U.S. PATENT DOCUMENTS

| | | | |
|---|---|---|---|
| 8,456,291 B2 * | 6/2013 | Tanaka et al. | 340/426.33 |
| 2004/0212487 A1 | 10/2004 | Yagi et al. | |
| 2005/0097948 A1 | 5/2005 | Suzuki | |
| 2006/0052920 A1 | 3/2006 | Watabe | |
| 2007/0069879 A1 | 3/2007 | Kuchler | |
| 2007/0171038 A1 | 7/2007 | Maekawa | |
| 2010/0066521 A1 | 3/2010 | Yoshida | |

FOREIGN PATENT DOCUMENTS

| | | |
|---|---|---|
| JP | 2008-086190 | 4/2008 |
| JP | 2008-126959 | 6/2008 |
| JP | 2009-033809 | 2/2009 |
| JP | 2009-189120 | 8/2009 |

* cited by examiner

AIR PRESSURE MANAGEMENT DEVICE FOR VEHICLE TIRE AND VEHICLE TIRE CAPABLE OF OUTPUTTING AIR PRESSURE INFORMATION

This application is a continuation of U.S. Ser. No. 12/859,438, filed Aug. 19, 2010, which in turn claims the benefit of Japanese Patent Application No. 2009-192473 filed on Aug. 21, 2009, the contents of which are hereby incorporated by reference.

BACKGROUND OF THE INVENTION

1. Field of the Invention

The present invention relates to an air pressure management device for a vehicle tire and a vehicle tire capable of outputting air pressure information.

2. Description of Related Art

In recent years, an insufficient tire pressure has been drawing attention as a cause of a traffic accident, and various proposals are made under a trend of mandatory installation of a tire pressure monitoring system (TPMS). For example, in Japanese Patent Application Laid-open No. 2008-86190, there is proposed an installation of a communication device, which is supplied with electric power for its operation by an electrostatic-induction type electric power generator employing an electret for generating electric power by vibrations of a vehicle, and which detects tire air pressure and internal tire temperature and outputs the detected tire air pressure and internal tire temperature through wireless communication, on the tire or a tire wheel of the vehicle. Moreover, Japanese Patent Application Laid-open No. 2009-33809 may be cited as another related technical document.

However, a practical air pressure management device for a tire and a practical vehicle tire capable of outputting air pressure information still have many problems to be overcome, including a problem with power supply inside the tire.

SUMMARY OF THE INVENTION

In view of the above-mentioned circumstances, the present invention has an object to provide a practical air pressure management device for a tire and a practical vehicle tire capable of outputting air pressure information.

In order to achieve the above-mentioned object, the present invention provides a vehicle tire including: a ferroelectric member including a plurality of floating electrode portions arranged in a line on one surface thereof; a movable member including a plurality of electret portions stably maintaining a surface electric potential of approximately 100 volts at a temperature of 100° C. and a plurality of opposed electrode portions, the plurality of electret portions and the plurality of opposed electrode portions being arranged in a line alternately so as to face the plurality of floating electrode portions, the movable member being supported by the ferroelectric member so that the plurality of electret portions and the plurality of opposed electrode portions are moved by an external vibration in parallel to the plurality of floating electrode portions; an air pressure sensor supplied with electric power generated by the movable member; and a wireless communication unit supplied with the electric power generated by the movable member, for transmitting air pressure data detected by the air pressure sensor to an outside. As a result, a battery-less vehicle tire having an air pressure detection function that is practically used under severe conditions which a vehicle may undergo may be provided.

It should be noted that other features, elements, steps, advantages, and characteristics of the present invention will become more apparent from the following detailed description of a preferred embodiment and accompanying drawings relating thereto.

DETAILED DESCRIPTION OF PREFERRED EMBODIMENT

Figure 1:
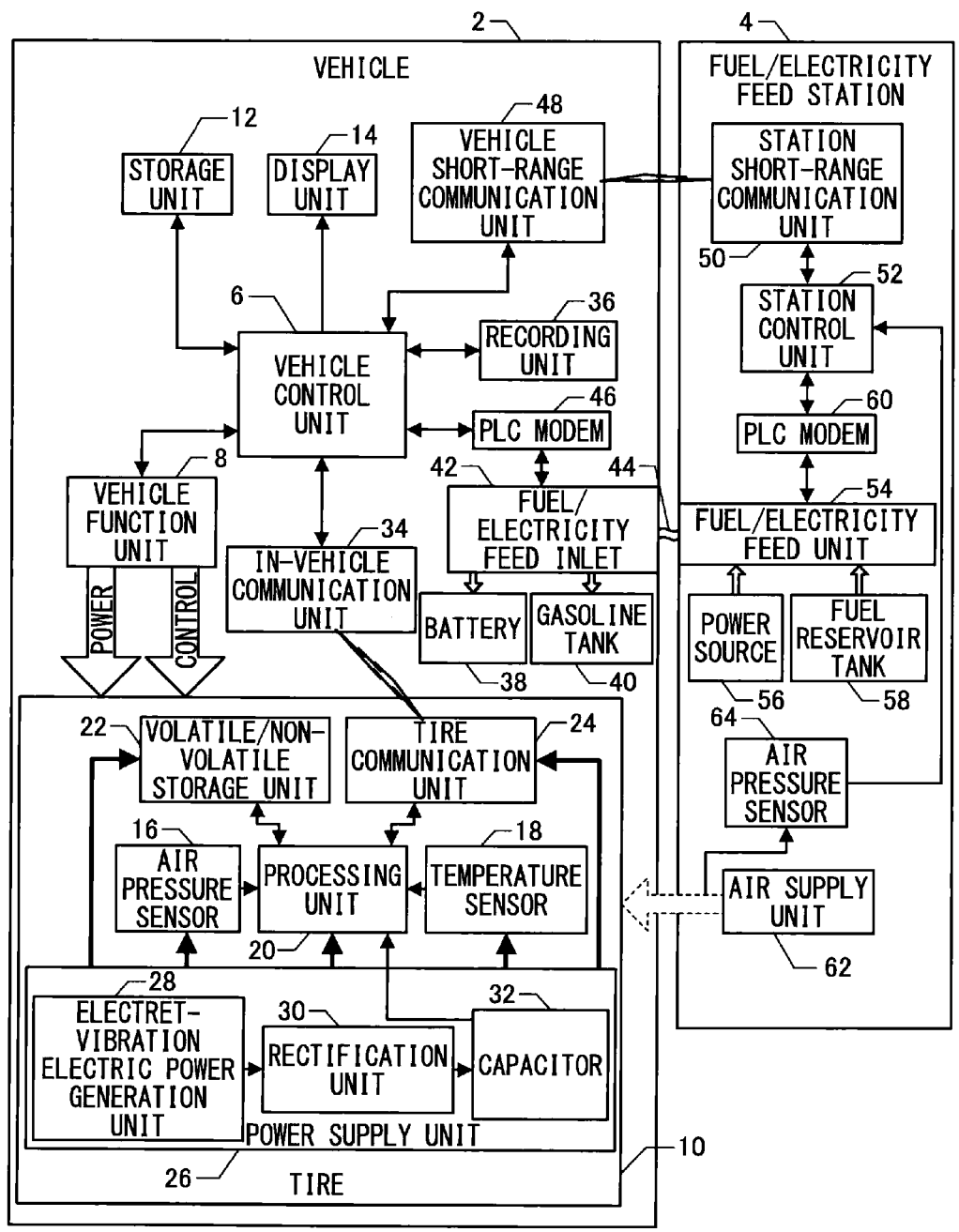
FIG. 1 is a block diagram illustrating an example of an air pressure management device system for a tire according to an embodiment of the present invention.

FIG. 1 is a block diagram illustrating an example of an air pressure management device system for a tire according to an embodiment of the present invention. The air pressure management device system for a tire according to this example is centered around a vehicle 2 which is any one of a gasoline engine vehicle, an electric vehicle, and a so-called hybrid vehicle employing both a gasoline engine and a motor, and is a system cooperating with a fuel/electricity feed station 4. The vehicle 2 illustrated in FIG. 1 has a structure of a hybrid vehicle as an example.

The vehicle 2 includes a vehicle control unit 6 constituted by a computer for controlling the entire vehicle 2, which controls a vehicle function unit 8 in response to an operation of a driver of the vehicle 2. Main functions of the vehicle function unit 8 are supply of travel power and travel control of the vehicle 2, such as turning control, and the power and the control are finally transmitted to tires 10, thereby enabling travel of the vehicle 2 based on an operation of the driver. Functions of the vehicle control unit 6 are carried out by software programs stored in a storage unit 12. The storage unit 12 further temporarily stores various types of data required for the control of the entire vehicle 2. Moreover, the vehicle control unit 6 controls a display unit 14 to display GUIs required for operations, and to display control results. Further, the display unit 14 additionally has a function of displaying an air pressure abnormality when this abnormality occurs, which is described later.

The vehicle 2 has a tire pressure monitoring system installed thereon, and is provided with tire air pressure sensors 16 and internal tire temperature sensors 18 inside the tires 10. Information detected by the air pressure sensors 16 and the temperature sensors 18 is processed by a processing unit 20, is stored in a storage unit 22, and is also transmitted via tire communication units 24 to the outside of the tires 10. A power supply unit 26 is provided in the tire 10 for supplying the respective components in the tire 10 with electric power indicated by bold arrows. A power source of the power supply unit 26 is an electret-vibration electric power generation unit 28 which generates electric power by various vibrations applied to the tire 10 and vibrations caused by rotation of the tire 10. A detailed description thereof is given later.

The electret-vibration electric power generation unit 28 generates an AC based on the vibration, and a rectification unit 30 rectifies the AC into a DC, and accumulates the DC in a capacitor 32. The electric power accumulated in the capacitor 32 is supplied respectively to the air pressure sensor 16, the temperature sensor 18, the processing unit 20, the storage unit 22, and the tire communication unit 24. It should be noted that the capacitor 32 does not have a capacity for supplying these components with the electric power for a long period after the power supply from the electret-vibration electric power generation unit 28 stops. If the vehicle 2 is parked while the engine is turned off, the power supply unit 26 no longer maintains the power supply capability unless a vibration is caused from a ground by other vehicles traveling on roads around the parking location. When the vehicle 2 is stationary while the engine is running, the electret-vibration electric power generation unit 28 can generate some electric power by vibrations of the engine. The storage unit 22 may operate in a volatile mode enabling a high-speed operation, and in a non-volatile mode maintaining the memory without the power supply, and enters the non-volatile mode according to the control of the processing unit 20 when the electret-vibration electric power generation unit 28 stops the generation of the electric power, and the voltage of the capacitor 32 decreases below a predetermined voltage, thereby holding the detected information of the air pressure sensor 16 and the temperature sensor 18 stored on this occasion, and the state of the processing unit 20 on this occasion.

The tire communication unit 24 transmits the detected information of the air pressure sensor 16 and the temperature sensor 18 directly or indirectly via the storage unit 22 to an in-vehicle communication unit 34. The indirect transmission is carried out in a case where intermittent transmission is desired in order to restrain the electric power consumption when the electric power supply from the electret-vibration electric power generation unit 28 is low due to the stationary state of the vehicle 2 or the like. The detected information of the air pressure sensor 16 and the temperature sensor 18 received by the in-vehicle communication unit 34 is processed by the vehicle control unit 6, and is used for analyzing whether the air pressure and the temperature of the tire 10 are appropriate. The analysis result is stored in a recording unit 36. Relationships between the detection by the air pressure sensor 16 and the temperature sensor 18 and the transmission of the detected information from the tire communication unit 24 to the in-vehicle communication unit 34, and the electric power generated by the electret-vibration electric power generation unit 28 serving as the power source of those functions, details of the processing of the detected information from the air pressure sensor 16 and the temperature sensor 18 received by the vehicle control unit 6, and the like are described later.

The vehicle 2 includes a battery 38 and a gasoline tank 40 which serve as energy supply sources to the vehicle function unit 8 for the hybrid travel. The battery 38 and the gasoline tank 40 receive the electric power and the gasoline respectively fed through a fuel/electricity feed cable 44 to be connected to the fuel/electricity feed station 4 via a fuel/electricity feed inlet 42. Moreover, a power line communication (PLC) modem 46 is connected to electric power supply portion of the fuel/electricity feed inlet 42, and the vehicle control unit 6 may carry out the wired power line communication with the fuel/electricity feed station 4 via a power line portion of the fuel/electricity feed cable 44. The vehicle 2 further includes a vehicle short-range communication unit 48, may thus carry out wireless communication with the fuel/electricity feed station 4, and carries out the communication via the vehicle short-range communication unit 48 particularly if the fuel/electricity feed cable 44 is not connected.

The fuel/electricity feed station 4 is provided with a station short-range communication unit 50 for communicating with the vehicle 2 when the vehicle 2 visits the fuel/electricity feed station 4 for fueling or charging. A fuel/electricity feed unit 54 feeds the fuel and electricity through the fuel/electricity feed cable 44 from a power source 56 and a fuel reservoir tank 58 to the fuel/electricity feed inlet 42 of the vehicle 2 as described above. On this occasion, when the vehicle 2 is an electric vehicle or a hybrid vehicle, the power line communication with the vehicle 2 is carried out using a PLC modem 60 connected to the fuel/electricity feed unit 54 through the fuel/electricity feed cable 44.

The fuel/electricity feed station 4 further includes an air supply unit 62 for filling the tires 10 of the vehicle 2 with air. Further, the fuel/electricity feed station 4 includes an air pressure sensor 64 for detecting the air pressure of the tire 10 to which the air is being supplied. The air pressure detected by this air pressure sensor 64 is transmitted from a station control unit 52 to the vehicle 2 by means of the power line communication or the short-range communication. The tire air pressure detected by the air pressure sensor 64 is reliable. Hence, the air pressure transmitted to the vehicle 2 and the air pressure detected by the air pressure sensor 16 incorporated into the tire 10 may be compared, and the detected information of the air pressure sensor 16 may be calibrated using the detected information of the air pressure sensor 64 as a reference. A vibration is caused by the air supply during the air supply from the fuel/electricity feed station 4, and hence the electret-vibration electric power generation unit 28 can generate some electric power even if the vehicle 2 is stationary while the engine is turned off. Accordingly, the air pressure sensor 64 and the air pressure sensor 16 may simultaneously detect the air pressure for the same tire 10 to which the air is being supplied, and the obtained values of the air pressure may be compared with each other.

Figure 2A:
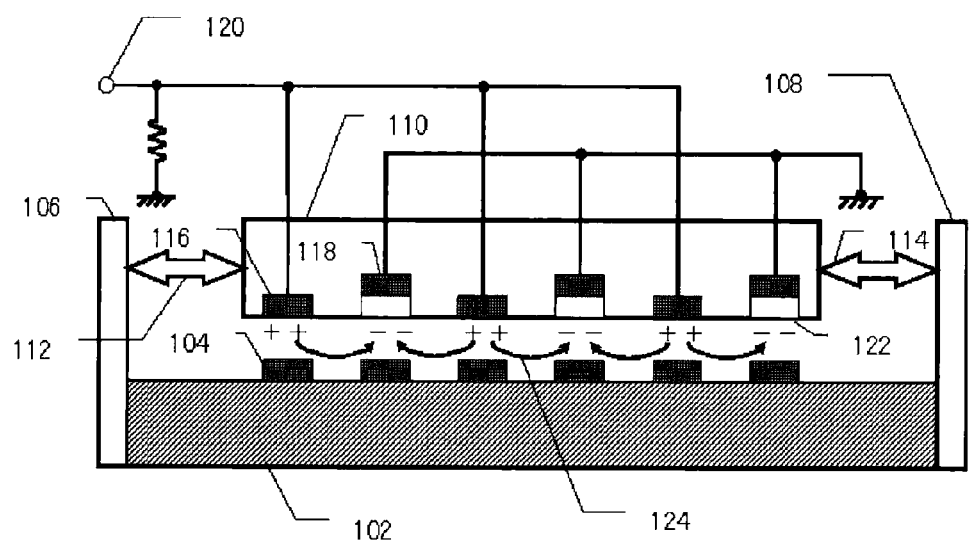
FIGS. 2A and 2B are schematic cross sectional views illustrating a detailed structure and functions of an electret-vibration electric power generation unit of FIG. 1.
Figure 2B:
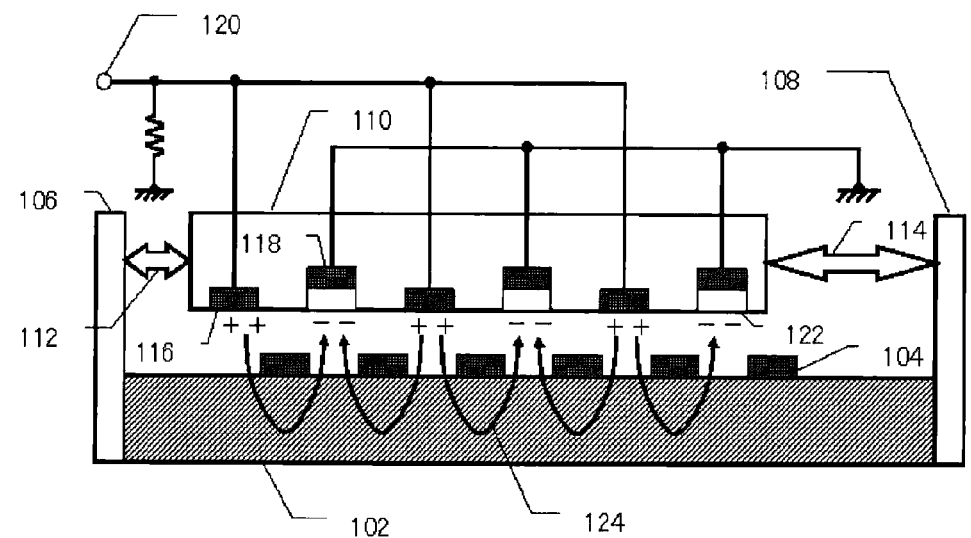

FIGS. 2A and 2B are schematic cross sectional views illustrating a detailed structure and functions of the electret-vibration electric power generation unit 28 of FIG. 1, and FIG. 2A and FIG. 2B respectively illustrate different states in terms of vibration. The structure schematically illustrated in FIGS. 2A and 2B is actually a microstructure manufactured by means of the MEMS technologies. A description is first given of the structure. A plurality of floating electrodes 104 are formed into a comb shape (cross sections thereof are illustrated in FIGS. 2A and 2B) on a ferroelectric substrate 102 in FIGS. 2A and 2B. The floating electrode 104 is in an electrically floating state, namely in a state in which a connection is not made to a ground terminal or a power supply terminal. The ferroelectric substrate 102 is formed of a PZT plate or $BaTiO_3$ on a ceramic plate, for example, and usually has a relative permittivity $\in$ of 1,000 or more. Moreover, support portions 106 and 108 are fixed on the ferroelectric substrate 102.

On the other hand, a movable member (proof mass) 110 is supported by elastic members 112 and 114 between the support portions 106 and 108 above the ferroelectric substrate 102 so as to move in the horizontal direction of FIGS. 2A and 2B. A plurality of opposed electrodes 116 and base electrodes 118 opposed to the ferroelectric substrate 102 are alternately formed into a comb shape (cross sections thereof are illustrated in FIGS. 2A and 2B) on the movable member 110. The opposed electrodes 116 are respectively connected to an output terminal 120, and the base electrodes 118 are respectively grounded. Further, a plurality of electrets 122 opposed to the ferroelectric substrate 102 are respectively formed on the base electrodes 118. The electret 122 is a charge holding member for stably maintaining a charged negative charge.

In particular, it is important to select an electret which may stably maintain the charge even in a tire of a vehicle, which may reach 100° C. during traveling, as the electret 122 used for the present invention. An example of an electret that meets the requirement is an inorganic charge holding member having a double-layer structure which is obtained by forming a silicon nitride (such as $Si_4N_4$) into a thickness of approximately 100 nanometers by chemical vapor deposition under the atmospheric pressure on a silicon oxide (such as $SiO_2$) thermally grown into a thickness of approximately 300 nanometers on a silicon wafer. The electret having this double-layer structure is detailed in, for example, "Charge Storage in Double Layers of Thermally Grown Silicon Dioxide and APCVD Silicon Nitride", IEEE Transactions on Dielectrics and Electrical Insulation, Vol. 6, No. 6, PP. 852 to 857, December 1999. The charging of the electret 122 is described later.

When the opposed electrodes 116 and the base electrodes 118 are directly above the floating electrodes 104 as illustrated in FIG. 2A in the structure as described above, the electric flux lines of fringe electric fields 124 are blocked by the floating electrodes 104, and hardly enter the inside of the ferroelectric substrate 102. This is because the electric flux line penetrates a dielectric material, and does not penetrate a conductor material. Conversely, when the movable member 110 moves in the horizontal direction with respect to the ferroelectric substrate 102, and the opposed electrodes 116 and the base electrodes 118 consequently move to positions displaced in the horizontal direction from the floating electrodes 104 as illustrated in FIG. 2B, the electric flux lines of the fringe electric fields 124 are not blocked by the floating electrodes 104, and thus enter deeply into the inside of the ferroelectric substrate 102. As a result, a change between the state of FIG. 2A and the state of FIG. 2B causes the equivalent relative permittivity ∈r between the electrets 122 and the opposed electrodes 116 to change, resulting in a change in capacitance formed therebetween.

On this occasion, the negative charges maintained by the electrets 122 are invariant, and hence the change in capacitance between the electrets 122 and the opposed electrodes 116 causes the positive charge on the opposed electrodes 116 to move via the output terminal 120, resulting in an output current. Thus, when the movable member 110 vibrates between the positions in FIGS. 2A and 2B due to an external vibration, an AC is output from the output terminal 120, resulting in electric power generation. A state in which the movable member 110 is displaced by a vibration by half a pitch of the floating electrodes 104 is illustrated in FIGS. 2A and 2B for the sake of simplicity. However, when the movable member 110 moves in one direction by an external vibration in an actual structure, the movable member 110 may move by several pitches of the floating electrodes 104, and hence the state illustrated in FIG. 2A and the state illustrated in FIG. 2B appear repeatedly also when the movable member 110 moves in one direction. Thus, several cycles of the AC output is obtained only by the movement of the movable member 110 in one direction due to a capacitance change caused by this movement. A similar state certainly appears when the movable member 110 returns. The structure described above enables practical electric power generation if the surface electric potential due to the negative charge maintained by the electret 122 is a little less than minus 100 volts. This enables an employment of an electret which may stably maintain a charge under the above-mentioned operation condition in which the temperature may reach as high as 100° C., which means that it is possible to realize the electret-vibration electric power generation unit 28 practically used in the tires 10 of the vehicle 2.

Figure 3:
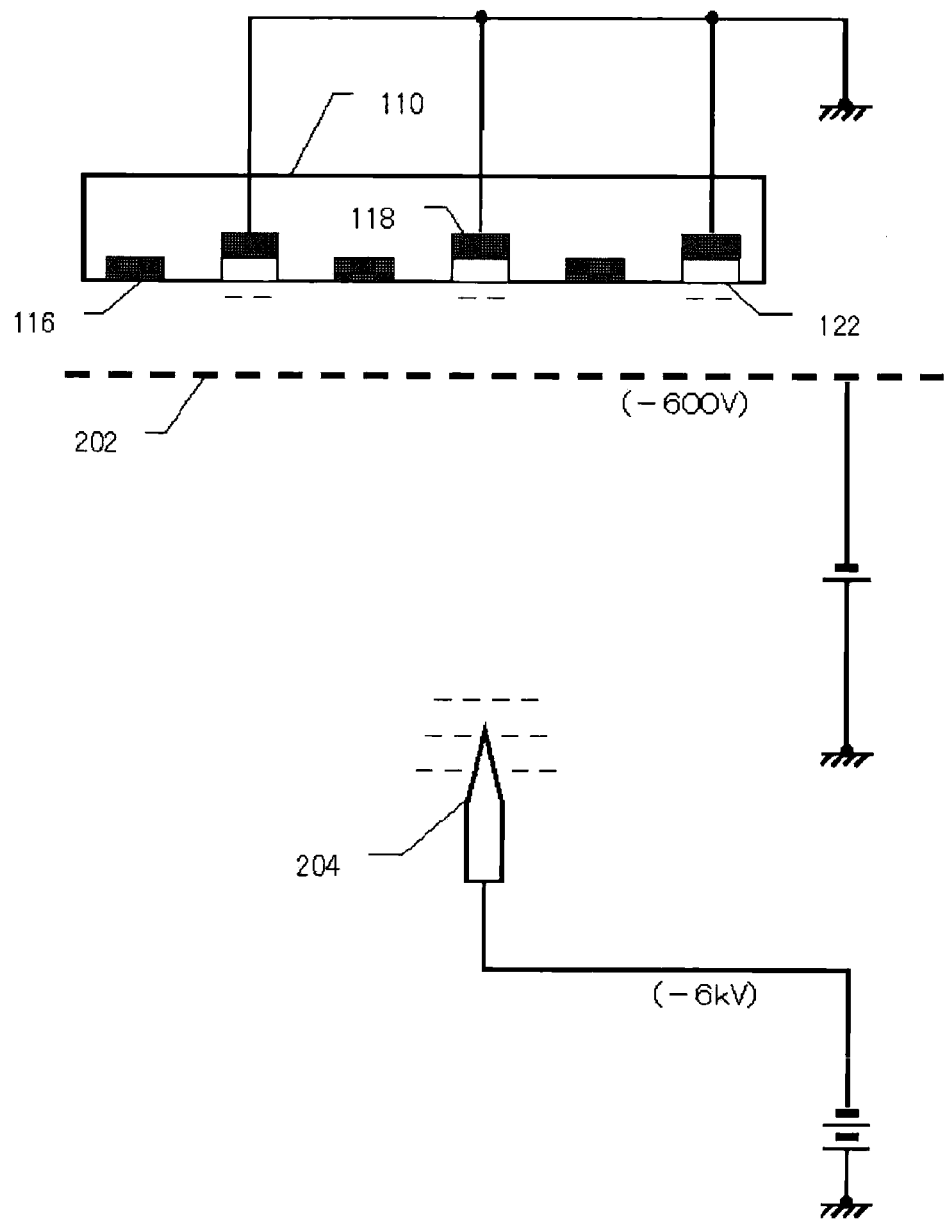
FIG. 3 is a schematic cross sectional view illustrating a charging process of electrets.

FIG. 3 is a schematic cross sectional view illustrating a state of a charging process of the electret 122, and the same reference numerals are assigned to the respective structures of the movable member 110 as in FIGS. 2A and 2B. The charging is carried out before the movable member 110 is opposed to the ferroelectric substrate 102, and charges the electret 122 to a surface electric potential of approximately minus 100 volts by disposing a grid 202 to which minus 600 volts is applied, and simultaneously applying 6 kilovolts to a needle 204 on the opposite side, thereby causing a corona discharge.

Figure 4:
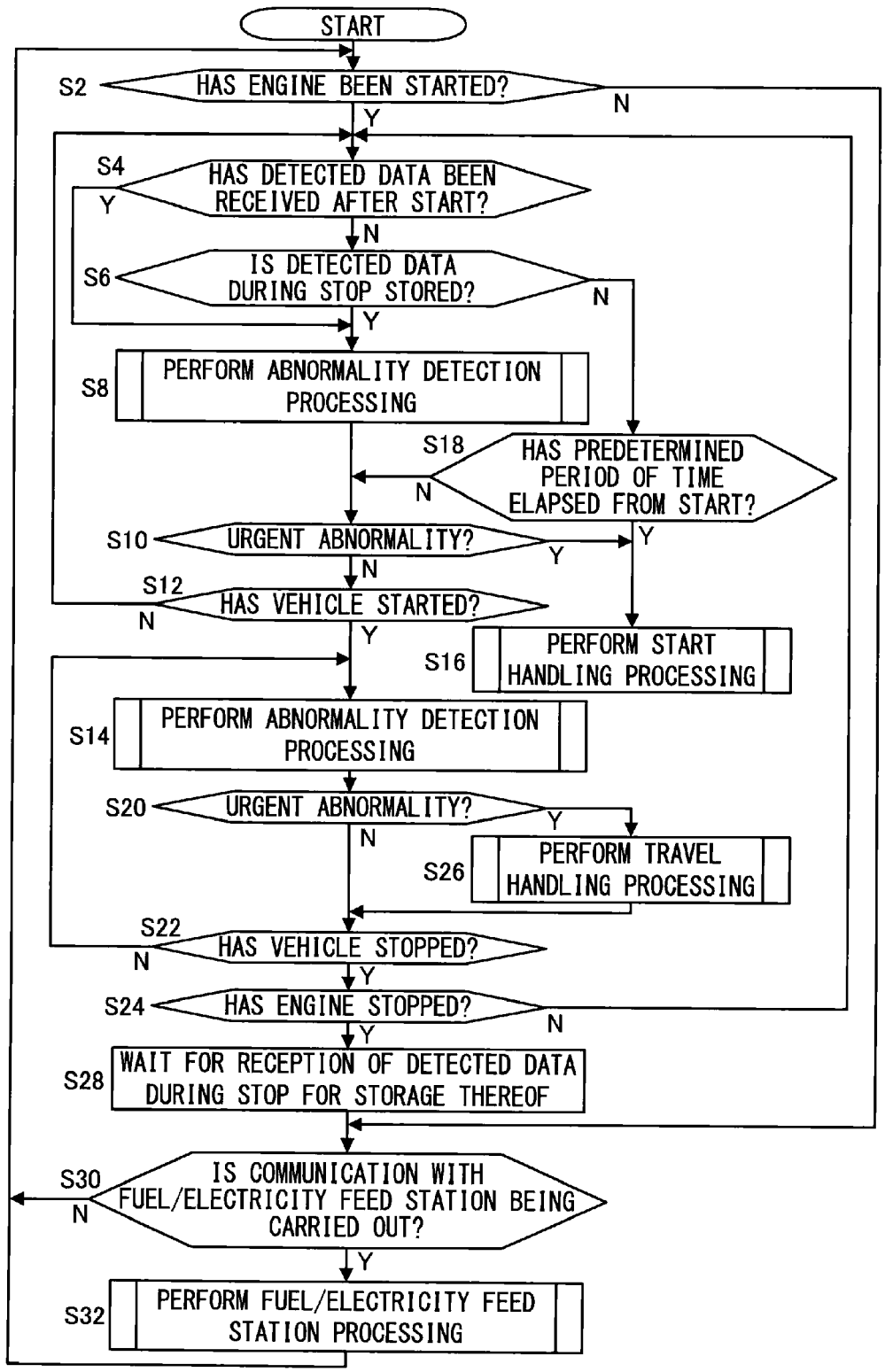
FIG. 4 is a basic flowchart illustrating a function of a vehicle control unit according to the example of FIG. 1.

FIG. 4 is a basic flowchart illustrating a function of the vehicle control unit 6 of the vehicle 2 according to the example illustrated in FIG. 1. The flow starts when the vehicle 2 is connected to the battery 38, and the vehicle control unit 6 checks in Step S2 whether or not the engine (or motor, generally referred to as "engine" throughout the specification) has started. When the vehicle control unit 6 detects that the engine has started, the vehicle control unit 6 proceeds to Step S4, and checks whether detected data such as the tire air pressure and the tire internal temperature are received from the tire 10 after the start. When the reception of such data is not detected, the vehicle control unit 6 proceeds to Step S6, and checks whether data detected during the stop of the engine has been received and stored. This is because the electric power generation by the electret-vibration electric power generation unit 28 is carried out by vibrations from the ground caused by other vehicles traveling on roads near the parking location even when the vehicle 2 is parking while the engine is turned off as described before according to the example of the present invention, and the detection of the tire air pressure and the tire internal temperature and the transfer of the data thereof may have been carried out when the engine is stopped.

When the vehicle control unit 6 determines in Step S6 that the memory of the detection during stop is present, the vehicle control unit 6 proceeds to Step S8, and enters abnormality detection processing. A detailed description thereof is given later. Moreover, when the vehicle control unit 6 determines in Step S4 that the detected data such as the tire air pressure and the tire internal temperature has been received after the start, the vehicle control unit 6 proceeds directly to Step S8. This means that the data detected after the start is newer than the data detected during the stop, and the vehicle control unit 6 thus quickly proceeds to the abnormality detection processing regardless of the presence/absence of the memory of the detection during stop. After the abnormality detection processing in Step S8 is finished, the vehicle control unit 6 proceeds to Step S10, and checks whether the result of the detection processing indicates an urgent abnormality. The urgent abnormality relates to a state in which start or continuation of the travel causes a high risk of a flat tire. Then, when the result of the detection processing does not indicate an urgent abnormality in Step S10, the vehicle control unit 6 proceeds to Step S12, and checks whether the vehicle 2 has started. When the start is detected in Step S12, the vehicle control unit 6 proceeds to Step S14, and when the start is not detected, the vehicle control unit 6 returns to Step S4, and repeats the processing from Step S4 to Step S12 as long as an urgent abnormality is not detected in Step S10, and the start is not detected in Step S12, thereby preparing for abnormality generation until the start.

On the other hand, when the vehicle control unit 6 detects that the result of the abnormality detection processing indicates an urgent abnormality in Step S10, the vehicle control unit 6 proceeds to Step S16, thereby proceeding to start handling processing. The start handling processing in Step S16 is processing of warning the driver of the vehicle 2 by means of a sound or a display that the tire air pressure is decreased to a level at which the start without taking any measures causes a danger. The display unit 14 or the like is used for this display. Moreover, Step S10 precedes Step S12, and hence when the vehicle control unit 6 proceeds from Step S10 to Step S16, the vehicle control unit 6 does not reach Step S12. This means the normal start operation is inhibited if an urgent abnormality is detected. It may be more appropriate to travel to the fuel/electricity feed station 4 by itself in a safe operation for refilling the air even in the state of an urgent abnormality than prohibiting the drive, and it is thus possible to cancel the warning at one's own risk in the start handling processing in Step S16, and to make a request for an interrupt by predetermined special steps/operations, thereby proceeding from Step S12 to Step S14.

When the memory of the detection during stop is not present in Step S6, the vehicle control unit 6 proceeds to Step S18, and checks whether a predetermined period of time has elapsed from the start. The arrival to Step S18 means that the detected data was absent after the start in Step S4, and the vehicle control unit 6 checks in Step S18 whether this state has continued for the predetermined period of time since the start. When the present state corresponds to such an abnormal state, even if the engine has started, and the electret-vibration electric power generation unit 28 can generate the power, the detected data is not received, which implies that a certain failure is present in the detection of the tire air pressure, and the vehicle control unit 6 thus proceeds to Step S16. The start handling processing in Step S16 addresses in this way the case in which the tire air pressure itself may not be detected, in addition to the case in which the tire air pressure is abnormal. When the vehicle control unit 6 determines that the predetermined period of time has not elapsed yet in Step S18, the vehicle control unit 6 proceeds to Step S10, and then proceeds from Step S10 to Step S12 because the abnormality processing is not required. Subsequently, the vehicle control unit 6 repeats a loop routing through Steps S4, S6, S18, S10, and S12 while waiting for a reception of the detected data.

The abnormality detection processing during the travel is carried out in Step S14. Contents of the processing in Step S14 are the same as those of Step S8, and are described later. After the abnormality detection processing in Step S14 is finished, the vehicle control unit 6 proceeds to Step S20, and checks whether the result of the detection processing indicates an urgent abnormality. Then, when the result of the detection processing does not indicate an urgent abnormality in Step S20, the vehicle control unit 6 proceeds to Step S22, and checks whether the vehicle 2 has stopped. When the stop is detected in Step S22, the vehicle control unit 6 proceeds to Step S24, and when the stop is not detected, the vehicle control unit 6 returns to Step S14, and repeats Steps S14, S20, and S22 as long as an urgent abnormality is detected in Step S20 or the stop is not detected in Step S22, thereby preparing for abnormality generation during the travel.

On the other hand, when the vehicle control unit 6 detects that the result of the abnormality detection processing is an urgent abnormality in Step S20, the vehicle control unit 6 proceeds to Step S26, which is travel handling processing. The travel handling processing in Step S26 is processing of warning the driver of the vehicle 2 by means of a sound or a display that the tire air pressure is decreased to a level at which continuous travel without taking any measures causes a danger. When an abnormality is detected during travel, various conditions are conceivable, and hence compulsory processing is thus dangerous on the contrary. The vehicle control unit 6 leaves specific processing to the driver, takes a warning action in Step S26, and then immediately returns to Step S22. The vehicle control unit 6 then repeats a loop routing through Steps S14, S20, S26, and S22, and continues the warning until the vehicle 2 stops. Step S26 is not limited to the structure described above, and may be configured to include an appropriate automatic danger avoidance action.

The vehicle control unit 6 checks in Step S24 whether the engine is turned off. When the stop of the engine is not detected, the vehicle control unit 6 returns to Step S4, and repeats Step S2 to Step S26 until the engine stop is detected. On the other hand, when the engine stop is detected in Step S24, the vehicle control unit 6 proceeds to Step S28, issues an instruction to wait so as to be able to receive and store detected data when the detected data arrives during the engine stop, and proceeds to Step S30. The vehicle control unit 6 checks in Step S30 whether the communication with the fuel/electricity feed station 4 is being carried out, and this check servers to handle a case in which the stop of the vehicle 2 and the engine is carried out upon the visit to the fuel/electricity feed station 4. Then, when the communication is detected, the vehicle control unit 6 proceeds to fuel/electricity feed station processing in Step S32, and returns to Step S2 when this processing is finished. On the other hand, when the communication is not detected in Step S30, the vehicle control unit 6 returns to Step S2, and may thus check the start of the engine. When the engine start is not detected in Step S2, the vehicle control unit 6 immediately proceeds to Step S30. Therefore, when the engine is not started, the vehicle control unit 6 waits for the engine start while repeating Steps S S2, S30, and S32.

Figure 5:
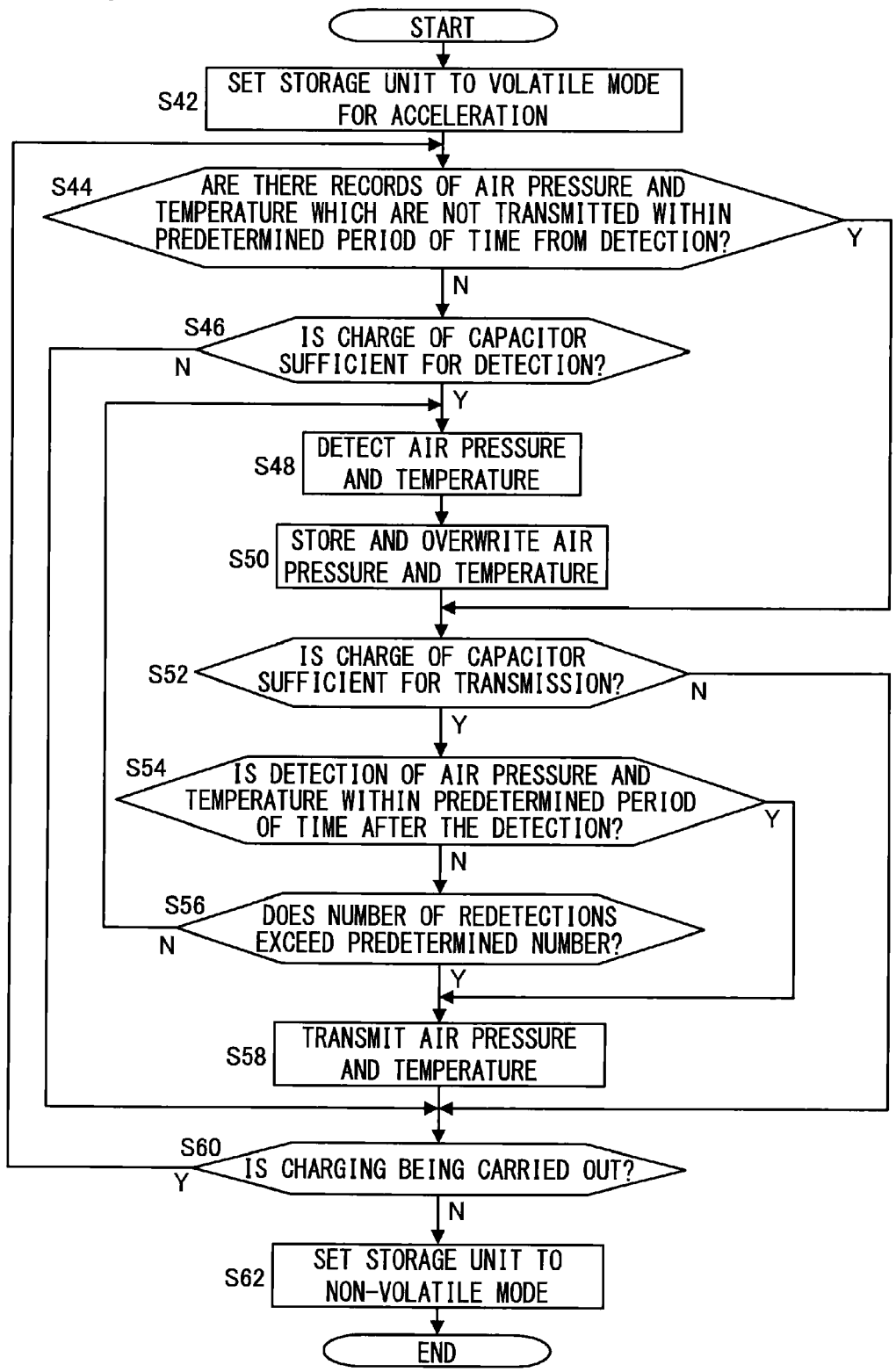
FIG. 5 is a flowchart illustrating a function of a processing unit of a tire according to the example of FIG. 1.

FIG. 5 is a flowchart illustrating a function of the processing unit 20 of the tire 10 according to the example of FIG. 1. The flow is started by detection of the electric power generation carried out by the electret-vibration electric power generation unit 28, and the processing unit 20 sets the storage unit 22 to a volatile mode, thereby accelerating the operation in Step S42. The storage unit 22 may operate in the volatile mode in which the high speed operation is enabled, and the non-volatile mode as described before. At the start of the flow, the storage unit 22 is in the non-volatile mode and is thus set to the volatile mode, thereby increasing the operation speed. The processing unit 20 then checks in Step S44 whether detection records by the air pressure sensor 16 and the temperature sensor 18 which are not transmitted within a predetermined period of time from detection are present in the storage unit 22. Then, when there is not such data, the control unit 20 proceeds to Step S46, and checks the charged voltage of the capacitor 32, thereby determining whether electric power which may be used for the detection by the air pressure sensor 16 and the temperature sensor 18 is accumulated.

When the control unit 20 determines in Step S46 that the electric power sufficient for the detection by the air pressure sensor 16 and the temperature sensor 18 is accumulated in the capacitor 32, the control unit 20 proceeds to Step S48, carries out the detection by the air pressure sensor 16 and the temperature sensor 18, stores the tire air pressure and the tire internal temperature detected in Step S50, or, if there are stored data, overwrites the data by the tire air pressure and the tire internal temperature, and proceeds to Step S52. On the other hand, when it is detected in Step S44 that there are records of the tire air pressure and the tire internal temperature which are not transmitted within the predetermined period of time from the detection, the control unit 20 directly proceeds to Step S52. This is because when there are new records, those records are to be used soon.

The control unit 20 checks the charged voltage of the capacitor 32 in Step S52, thereby determining whether electric power sufficient for the data transmission by the tire communication unit 24 is accumulated. When the control unit 20 determines that the transmission is possible, the control unit 20 proceeds to Step S54, and checks whether the detections by the air pressure sensor 16 and the temperature sensor 18 are within a predetermined period of time after the detection. When it is determined in Step S54 that the latest detections by the air pressure sensor 16 and the temperature sensor 18 are not within the predetermined period of time, and are thus old, the control unit 20 proceeds to Step S56, and checks whether the number of the redetections exceeds a predetermined number of times. Then, when the number of the redetections does not exceed the predetermined number, the control unit 20 returns to Step S48, carries out again the detection by the air pressure sensor 16 and the temperature sensor 18, thereby acquiring new data. The control unit 20 does not check whether the electric power sufficient for the detections is accumulated in the capacitor 32 on this occasion, and this is because it is already determined in Step S52 that the electric power sufficient for the transmission is accumulated in the capacitor 32, and it may be considered that the electric power for the detection is sufficient. In this way, as new data as possible is secured before the transmission.

On the other hand, when the control unit 20 determines in Step S56 that the number of the redetections exceeds the predetermined number, the control unit 20 proceeds to Step S58, transmits the existing records of the detected data by the air pressure sensor 16 and the temperature pressure sensor 18, and proceeds to Step S60. This prevents the transmission from being hindered when the quantity of the electric power generation by the electret-vibration electric power generation unit 28 is small in such a case that the vehicle 2 is parking or the like, and the electric power of the capacitor 32 is consumed by repeating only the redetection. When the control unit 20 determines in Step S54 that the time which has elapsed from the latest detection by the air pressure sensor 16 and the temperature sensor 18 is within the predetermined period of time, the control unit 20 immediately proceeds to Step S58 and carries out the transmission.

Conversely, when the control unit 20 determines in Step S46 that the charge of the capacitor 32 is not sufficient for the detections by the air pressure sensor 16 and the temperature sensor 18, or determines in Step S52 that the charge in the capacitor 32 is not sufficient for the data transmission by the tire transmission unit 24, the control unit 20 proceeds directly to Step S60. The control unit 20 checks in Step S60 whether the electret-vibration electric power generation unit 28 is generating the electric power, and returns to Step S44 when the electret-vibration electric power generation unit 28 is generating the electric power. This processing enables the acquisition and the transmission of the next data when the transmission is carried out, and the charge may be continued when the charge in the capacitor 32 is not sufficient for the detection or the transmission while waiting until the detection or the transmission becomes possible. On the other hand, when the control unit 20 detects in Step S60 that the electric power is not being generated, the control unit 20 proceeds to Step S62, sets the memory unit 22 to the non-volatile mode, and finishes the flow. The setting to the non-volatile mode enables the stored data to be used as described above when the flow of FIG. 5 is started again when the electric power generation is detected next time. Owing to the characteristics of the present invention, it is possible to adapt to the continuous and intermittent electric power generation by the electret-vibration electric power generation unit 28, thereby detecting and transmitting the information on the tire air pressure and the temperature in the tire 10 of the vehicle 2 as described above.

Figure 6:
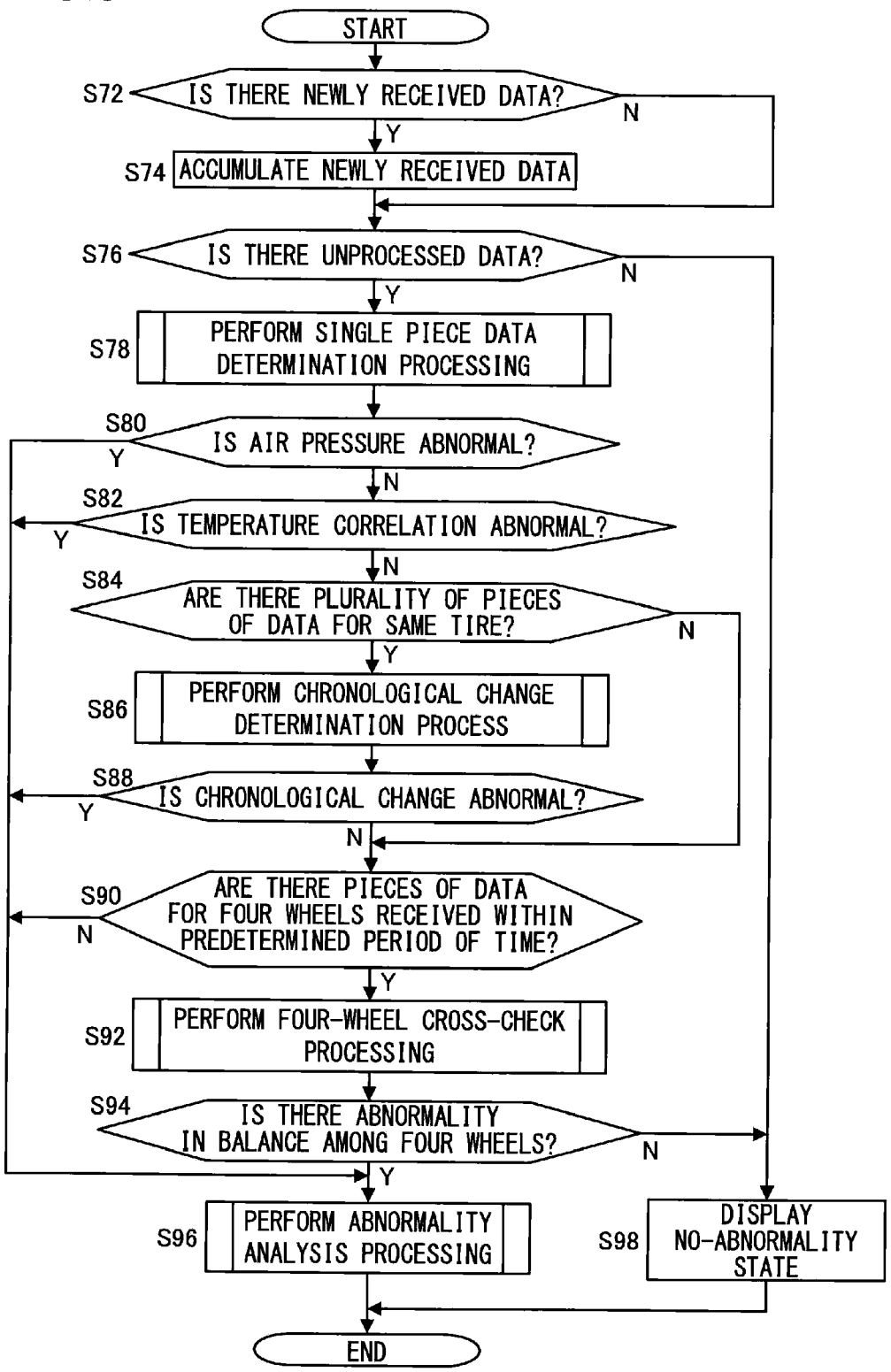
FIG. 6 is a flowchart illustrating details of Steps S8 and S14 of FIG. 4.

FIG. 6 is a flowchart illustrating details of the abnormality detection processing in Steps S8 and S14 of FIG. 4. When the flow starts, the vehicle control unit 6 checks in Step S72 whether data newly received from the tire 10 is present. When newly received data is present, the vehicle control unit 6 proceeds to Step S74, accumulates the newly received data in the recording unit 36, and proceeds to Step S76. On the other hand, when newly received data is not detected in Step S72, the vehicle control unit 6 proceeds directly to Step S76.

The vehicle control unit 6 checks absence/presence of unprocessed data in Step S76, and when there is unprocessed data, the vehicle control unit 6 proceeds to single piece data determination processing of Step S78, and first determines the unprocessed data as a single piece of data. Based on this determination, the vehicle control unit 6 then checks first in Step S80 whether it is determined that the absolute value of the air pressure itself is abnormal in Step S78. When the air pressure is not abnormal, the vehicle control unit 6 proceeds to Step S82, and checks whether it is determined that a temperature correlation abnormality is present in Step S78. This is because as the tire internal temperature increases, the air pressure increases. Hence, in the processing of Step S82, it is checked whether an abnormality is present in terms of this correlation. One example thereof is a case in which though the air pressure itself is not in an abnormal range, the tire internal temperature is abnormally high. When there is no abnormality in terms of the temperature correlation, the vehicle control unit 6 starts checking correlations among a plurality of pieces of data from Step S84.

The vehicle control unit 6 checks whether a plurality of pieces of data exist for the same tire 10 in Step S84. The case in which there are a plurality of pieces of data for the same tire 10 includes a case in which there are one piece of unprocessed data and data processed prior thereto for the same tire 10, in addition to a case in which there are a plurality of pieces of unprocessed data different in detection time for the same tire. When there are a plurality of pieces of data, the vehicle control unit 6 proceeds to chronological change determination processing in Step S86. A determination is made of a chronological change in the tire internal temperature in addition to a chronological change in the tire air pressure in chronological change determination processing. Then, the vehicle control unit 6 checks, in Step S88, whether it is determined that there is an abnormality in chronological change in Step S86. The case in which there is an abnormality in chronological change includes a case in which though single pieces of data are not in an abnormal range, a change of the data is large in a predetermined interval for the same tire. When the vehicle control unit 6 determines in Step S88 that there is no abnormality in chronological change, the vehicle control unit 6 proceeds to Step S90. If there are not a plurality of pieces of data for the same tire 10 in Step S84, the vehicle control unit 6 proceeds directly to Step S90.

The vehicle control unit 6 checks in Step S90 whether all data for the four wheels of the vehicle 2 are received in a predetermine period. When all the pieces of data for the four wheels are received, the vehicle control unit 6 proceeds to four-wheel cross-check processing in Step S92. Then, the vehicle control unit 6 checks, in Step S94, whether it is determined that there is an abnormality in balance among four wheels in Step S92. The case in which there is an abnormality in balance among the four wheels includes a case in which though single pieces of data of the individual four tires 10 are not in an abnormal range, a tire 10 different in data with respect to the other tires 10 is included or a balance is not appropriate between the front and rear tires 10 or between left and right tires 10.

When it is determined in Step S94 that there is an abnormality in balance among the four wheels in Step S92, the vehicle control unit 6 proceeds to abnormality analysis processing of Step S96. When it is determined that there is an abnormality in the air pressure in Step S80, in the temperature correlation abnormality in Step S82, or in chronological change abnormality in Step S88, or that not all the pieces of data for the four wheels within the predetermined period of time are not received in Step S90, the vehicle control unit 6 also proceeds to the abnormality analysis processing of Step S96 in the respective cases. The abnormality analysis processing in Step S96 handles these various cases, and details thereof are described later.

When the abnormality analysis processing in Step S96 is finished, the abnormality detection processing of FIG. 6 is finished, and the vehicle control unit 6 returns to Step S10 or S20 of FIG. 4. On the other hand, when it is determined that there is no unprocessed data in Step S76 or there is no abnormality in balance among the four wheels in Step S94, the vehicle control unit 6 proceeds to Step S98 in the respective cases, gives an instruction for display indicating no abnormality, and finishes the flow.

Figure 7:
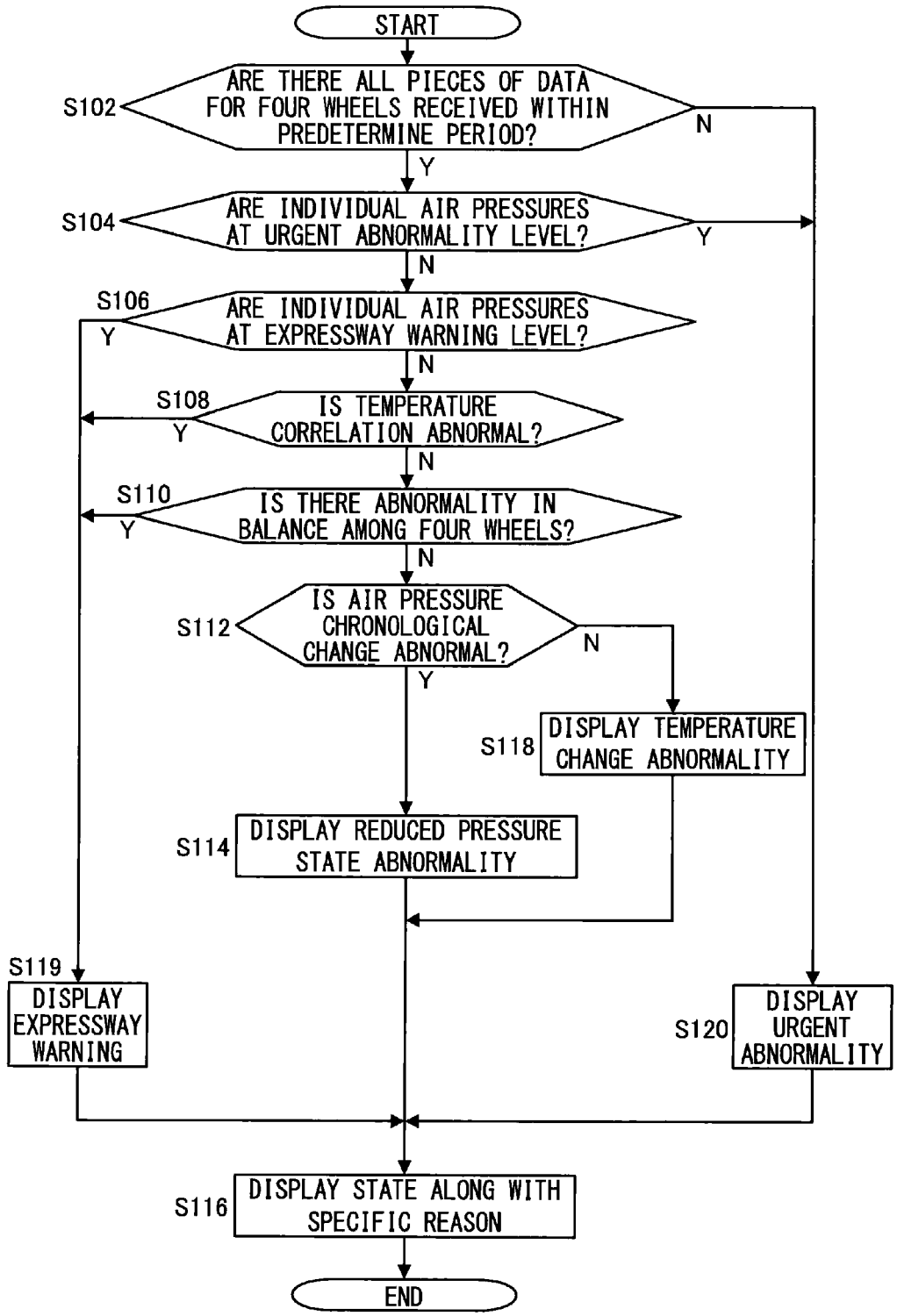
FIG. 7 is a flowchart illustrating details of Step S96 of FIG. 6.

FIG. 7 is a flowchart illustrating details of the abnormality analysis processing in Step S96 of the flowchart of FIG. 6. When the flow starts, the vehicle control unit 6 checks in Step S102 whether the entry to the abnormality analysis processing is carried out when the data for the four wheels within the predetermined period of time is present, and when all the pieces of data for the four wheels are received, the vehicle control unit 6 proceeds to Step S104 and the subsequent steps. The vehicle control unit 6 checks in Step S104 whether the entry to the abnormality analysis processing is carried out when there is an abnormality in the air pressure of the individual tires, and the individual air pressures are at an urgent abnormality level. The urgent abnormality level is, as described above, the state in which start or continuation of the travel causes a high risk of a flat tire. When the individual air pressures are not at the urgent abnormality level in Step S104, the vehicle control unit 6 proceeds to Step S106, and checks whether the entry to the abnormality analysis processing is carried out when there is an abnormality in the air pressure of the individual tires 10, and whether the individual air pressures are at an expressway warning level. The expressway warning level implies a state in which though travel on a local road does not pause a problem in the meantime, a long distance drive on an expressway generates a risk of a flat tire.

When the individual air pressures are not at the expressway warning level in Step S106, the vehicle control unit 6 proceeds to Step S108, and checks whether the entry to the abnormality analysis processing is carried out when there is a temperature correlation abnormality. When the entry is not caused by a temperature correlation abnormality, the vehicle control unit 6 proceeds to Step S110, and checks whether the entry to the abnormality analysis processing is carried out when there is an abnormality in balance among the four wheels. When the cause of the entry does not correspond to this case, the vehicle control unit 6 checks in Step S112 whether the entry to the abnormality analysis processing is carried out when there is an air pressure chronological change abnormality, and when the cause of the entry corresponds to this case, the vehicle control unit 6 proceeds to Step S114, carries out processing of giving an instruction for display of a reduced pressure state abnormality of the tire air pressure, and proceeds to Step S116. On the other hand, when it is not detected in Step S112 that the entry to the abnormality analysis processing is carried out when there is an air pressure chronological change abnormality, this logically means that the entry to the abnormality analysis processing is carried out when there is a tire internal temperature chronological change. In this case, the vehicle control unit 6 proceeds from Step S112 to Step S118, carries out processing of giving an instruction for display of the temperature chronological change abnormality, and proceeds to Step S116.

On the other hand, when it is confirmed that the entry to the abnormality analysis processing is carried out when individual air pressures are at the expressway warning level in Step S106, when there is a temperature correlation abnormality in Step S108, or when there is an abnormality in balance among the four wheels in Step S110, the vehicle control unit 6 proceeds to Step S119 in the respective cases, carries out processing of giving an instruction for display of expressway warning, and proceeds to Step S116.

Moreover, when it is confirmed that the entry to the abnormality analysis processing is carried out when the data for the four wheels within the predetermined period of time is not present in Step S102, or when there is an abnormality in the air pressure of the individual tires 10, and the individual air pressures are at the urgent abnormality level in Step S104, the vehicle control unit 6 proceeds to Step S120 in the respective cases, carries out processing of giving an instruction for display of an urgent abnormality, and proceeds to Step S116. As described above, in the abnormality analysis processing flow of FIG. 7, the various conditions are classified into "urgent abnormality", "expressway warning", "reduced pressure state abnormality", and "temperature change abnormality" in a descending order of the degree of emergency, and are determined, and the classified conditions are displayed. The vehicle control unit 6 gives an instruction for display of a specific reason in addition to the classification and determination in Step S116, and finishes the flow.

Figure 8:
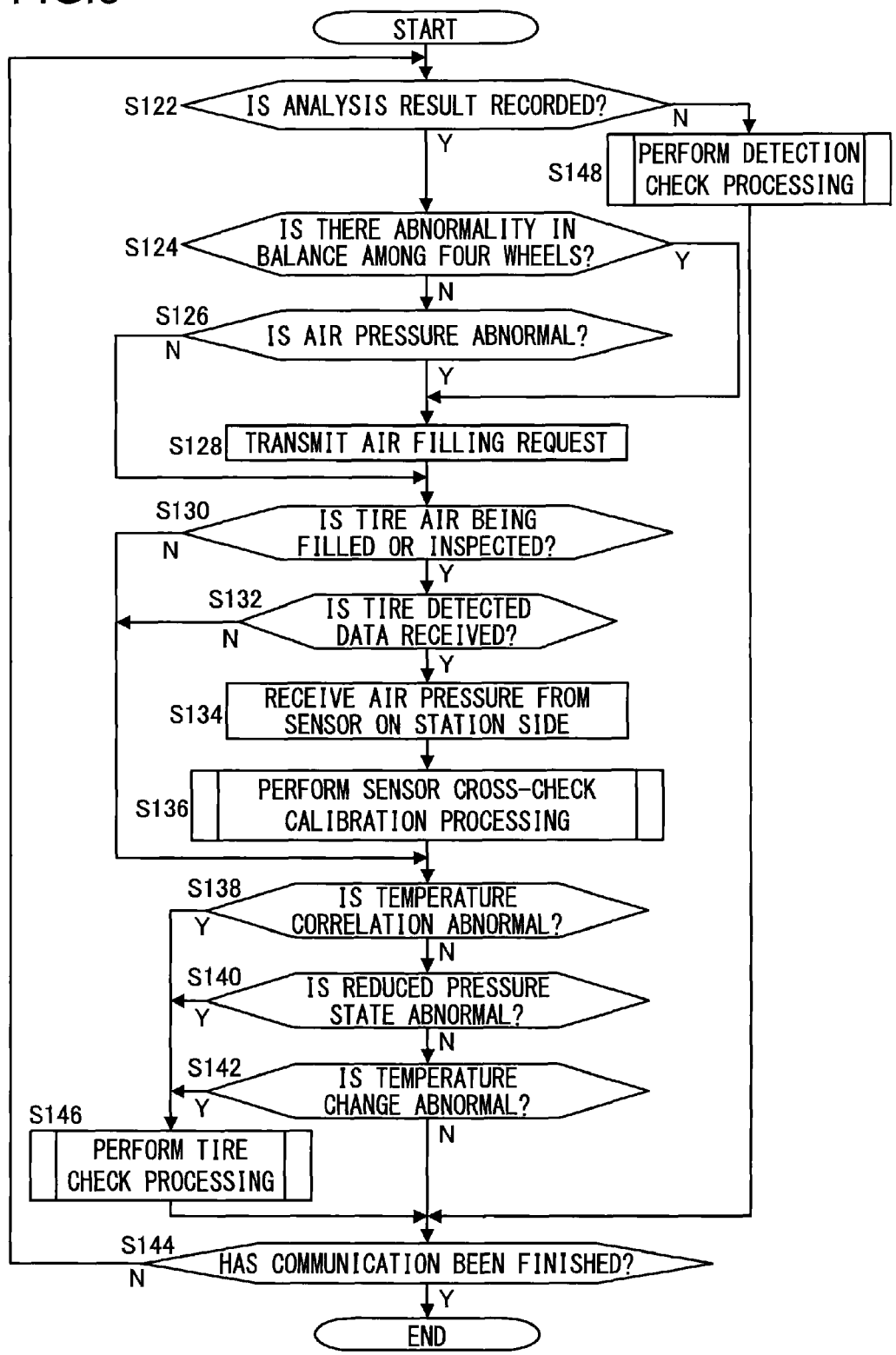
FIG. 8 is a flowchart illustrating detail of Step S32 of FIG. 4.

FIG. 8 is a flowchart illustrating details of the fuel/electricity feed station processing in Steps S32 of the flowchart of FIG. 4. When the flow starts, the vehicle control unit 6 checks in Step S122 whether the data of the analysis result of the detected tire air pressure and tire internal temperature is recorded in the recording unit 36. When there are records, the vehicle control unit 6 proceeds to Step S124, and checks whether an abnormality in balance among the four wheels is recorded. When a record of an abnormality in balance among the four wheels is not present, the vehicle control unit 6 proceeds to Step S126, and checks whether an air pressure abnormality is recorded. The abnormality in this case includes an abnormality at the high speed warning level. When a record of the air pressure abnormality is present, the vehicle control unit 6 proceeds to Step S128, transmits an air filling request signal to the fuel/electricity feed station 4, and proceeds to Step S130. This request signal is transmitted while information for identifying a tire 10 having the air pressure abnormality is added. Moreover, when the vehicle control unit 6 detects in Step S124 that an abnormality in balance among the four wheels is recorded, the vehicle control unit 6 immediately proceeds to Step S128. In this case, the request signal is transmitted in Step S128 while details of the abnormality in balance among the four wheels is added. When an air pressure abnormality is not recorded in Step S126, the vehicle control unit 6 directly proceeds to Step S130.

The vehicle control unit 6 checks in Step S130 whether the tires 10 are being filled with the air by the air feed unit 62, or the air pressure is being inspected at the fuel/electricity feed station 4. When the air is being filled or the air pressure is being inspected, even if the engine is stopped, the electret-vibration electric power generation unit 28 is in a state in which electric power may be generated by a vibration caused by an air filling/inspection operation. The vehicle control unit 6 checks in Step S132 whether detected data such as the air pressure during the filling of the air or the inspection has been received from the tires 10. When the data is received, the vehicle control unit 6 receives the tire air pressure measured externally by the air pressure sensor 64 of the fuel/electricity feed station 4 in Step S134, and proceeds to sensor cross-check calibration processing in Step S136. The vehicle control unit 6 compares the detected result by the air pressure sensor 16 of the tire 10 and the detected result by the air pressure sensor 64 of the fuel/electricity feed station 4 for the same tire 10 with each other, thereby calibrating the former detected value according to the more reliable latter detected result in the sensor cross-check calibration processing in Step S136. The air pressure sensors 16 of the tires 10 may be calibrated each time of the visit to the fuel/electricity feed station 4 in this way, thereby maintaining and increasing the reliability of the detection.

When the sensor cross-check calibration processing in Step S136 is finished, the vehicle control unit 6 proceeds to Step S138. Moreover, when the reception of the detected data from the tires 10 is not detected in Step S130, or the reception of the detected data by the air pressure sensors 16 of the tires 10 is not detected in Step S132, the vehicle control unit 6 directly proceeds to Step S138. The vehicle control unit 6 checks in Step S138 whether a temperature correlation abnormality is recorded in the recording unit 36. When a record is not present, the vehicle control unit 6 proceeds to Step S140, and then checks whether a reduced pressure state abnormality is recorded in the recording unit 36. When the record is not present, the vehicle control unit 6 proceeds to Step S142, and then checks whether a temperature change abnormality is recorded in the recording unit 36. When a record is not present, the vehicle control unit 6 proceeds to Step S144.

On the other hand, when it is confirmed that a temperature correlation abnormality is recorded in the recording unit 36 in Step S138, that a reduced pressure abnormality is recorded in the recording unit 36 in Step S140, or that a temperature change abnormality is recorded in the recording unit 36 in Step S142, the vehicle control unit 6 proceeds via tire inspection processing in Step S146 to Step S144. The tire inspection processing in Step S146 is processing relating to an extent from a tire inspection request directed to the fuel/electricity feed station 4 to handling of execution of the inspection. The temperature correlation abnormality, the reduced pressure state abnormality, and the temperature change abnormality are possibly caused by an abnormality such as a damage of the tire 10 itself, and this inspection processing is thus provided.

Moreover, when it is confirmed in Step S122 that the analysis result is not recorded in the recording unit 36, the vehicle control unit 6 proceeds via detection inspection processing of Step S148 to Step S144. The detection inspection processing of Step S148 includes processing of requesting the fuel/electricity feed station 4 for inspection of the electric power generation function of the electret-vibration electric power generation unit 28, and the detection function and the transmission function of the air pressure and the temperature in the tires 10, and processing of handling the execution of the inspection. The absence of the analysis record means that necessary detected data is not transmitted from the tire 10, and hence the processing of inspecting the functions relating to the detection in the tires 10 is thus provided.

The vehicle control unit 6 checks in Step S144 whether the communication with the fuel/electricity feed station 4 has been finished, and when the communication is not finished, returns to Step S122. As a result, the flow is repeated starting from Step S122, and subsequent various changes in state may be handled. In particular, when the air filling request is made in Step S128 upon the first flow execution, it is hardly conceivable that the air filling or the execution of the inspection is detected immediately after that in Step S130, and the air filling or the inspection of the tires 10 is waited for while repeating the flow of FIG. 8.

Hereinbelow, a comprehensive description is given of technical features disclosed in the specification.

As one of the technical features disclosed in the specification, there is provided a vehicle tire including: a ferroelectric member including a plurality of floating electrode portions arranged in a line on one surface thereof; a movable member including a plurality of electret portions stably maintaining a surface electric potential of approximately 100 volts at a temperature of 100° C. and a plurality of opposed electrode portions, the plurality of electret portions and the plurality of opposed electrode portions being arranged in a line alternately so as to face the plurality of floating electrode portions, the movable member being supported by the ferroelectric member so that the plurality of electret portions and the plurality of opposed electrode portions are moved by an external vibration in parallel to the plurality of floating electrode portions; an air pressure sensor supplied with electric power generated by the movable member; and a wireless communication unit supplied with the electric power generated by the movable member, for transmitting air pressure data detected by the air pressure sensor to an outside. As a result, a battery-less vehicle tire having an air pressure detection function that is practically used under severe conditions which a vehicle may undergo may be provided.

As another feature disclosed in the specification, there is provided a vehicle tire including an electret-vibration electric power generation unit; an electric power accumulation unit for accumulating electric power generated by the electret-vibration electric power generation unit; an air pressure sensor supplied with the electric power from the electric power accumulation unit; a wireless communication unit supplied with the electric power from the electric power accumulation unit, for transmitting air pressure data detected by the air pressure sensor to an outside; and a control unit for causing at least one of the air pressure sensor and the wireless communication unit to suspend the function thereof until the electric power accumulated in the electric power accumulation unit becomes sufficient. As a result, a vehicle tire which transmits the air pressure data to the outside with occasional adaptation to the electric power generation capability of the electret-vibration electric power generation unit may be provided.

As a specific feature disclosed in the specification, the vehicle tire further includes a storage unit for storing the air pressure data detected by the air pressure sensor, and the control unit causes the storage unit to store the air pressure data detected by the air pressure sensor, and the wireless communication unit to suspend the transmission until the electric power accumulated in the electric power accumulation unit becomes sufficient for the function of the wireless communication unit. As a result, the limited electric power may be distributed in terms of time, thereby transmitting the air pressure data to the outside. As a further specific feature, the control unit causes the air pressure sensor to detect again air pressure if a predetermined period of time or longer has elapsed from a time of the detection of the air pressure data stored in the storage unit when the electric power accumulated in the electric power accumulation unit becomes sufficient for the function of the air pressure sensor. As a result, useless old data may be prevented from being transmitted. As a still further specific feature, the control unit causes the wireless communication unit to transmit the air pressure data without causing the air pressure sensor to detect again the air pressure when a number of redetections of the air pressure by the air pressure sensor exceeds a predetermined number, even if the predetermined period of time or longer has elapsed from a time of detection of latest air pressure data stored in the storage unit. As a result, when sufficient electric power cannot be secured, it is possible to prevent a state in which the electric power is consumed only by repeating the detection of the air pressure data and the transmission cannot thus be carried out. As another feature disclosed in the specification, the control unit causes the air pressure sensor to suspend the detection of air pressure until the electric power accumulated in the electric power accumulation unit becomes sufficient for the function of the air pressure sensor. As described above, necessary electric power may be accumulated by appropriately suspending the functions when the quantity of the electric power generation is small.

As a further feature disclosed in the specification, there is provided an air pressure management device for a vehicle tire including: a vehicle tire supplied with electric power from an electret-vibration electric power generation unit, for detecting air pressure, and for wirelessly transmitting air pressure data obtained through detection to an outside; a processing unit for processing the air pressure data wirelessly transmitted from the vehicle tire; and a warning unit for issuing a warning if the air pressure data is not transmitted from the vehicle tire in a state in which the electret-vibration electric power generation unit is expected to generate the electric power. As a result, such a state may be avoided, in which an emergency state caused by a tire abnormality may not be handled because the tire air pressure itself may not be detected. An example of the state in which the electret-vibration electric power generation unit is expected to generate the electric power is a state in which an engine of a vehicle is activated, and a vibration of the engine is present. Another example thereof is a state in which a vehicle is traveling, and a vibration of the traveling is present. A still another example thereof is at lease one of a state in which air is being supplied to the vehicle tire to cause a vibration, and a state in which the air pressure of the vehicle tire is being inspected to cause a vibration.

As a still further feature disclosed in the specification, there is provided an air pressure management device for a vehicle tire including: a vehicle tire supplied with electric power from an electret-vibration electric power generation unit, for detecting air pressure, and for wirelessly transmitting air pressure data obtained through detection to an outside; a processing unit for processing the air pressure data wirelessly transmitted from the vehicle tire; and a standby control unit for waiting a state in which the electret-vibration electric power generation unit generates the electric power by an external vibration even if an engine of a vehicle is stopped, for the purpose of receiving the air pressure data transmitted from the vehicle tire even if the engine of the vehicle is stopped. As a result, the possibility of quickly recognizing an abnormality of the vehicle increases even when the operation of the vehicle starts. This is because even when the vehicle is stopped, various vibrations occur around a parking location, and therefore the air pressure may be detected and transmitted using the vibrations.

As a yet further feature disclosed in the specification, there is provided an air pressure management device for a vehicle tire including: a plurality of vehicle tires each supplied with electric power from an electret-vibration electric power generation unit, for detecting air pressure, and for wirelessly transmitting air pressure data obtained through detection to an outside; and a processing unit for processing a plurality of the air pressure data originated from a plurality of the wireless transmissions from at least one of the vehicle tires. As a result, an abnormality of the tire air pressure may be recognized soon.

As a specific feature disclosed in the specification, the processing unit processes a chronological change of the air pressure data transmitted from the same tire. As a result, it is possible to predict an abnormality in advance when a single piece of the air pressure data is not abnormal thus far but a change thereof occurs rapidly. As another specific feature of the above-mentioned invention, the processing unit processes the air pressure data transmitted from a plurality of different tires. More specifically, the processing unit issues a warning when the air pressure data are not transmitted from all the expected vehicle tires. As a result, it is possible to know an abnormality of the detection and communication capability, in particular. As a further specific feature of the above-mentioned invention, the processing unit compares the difference in the air pressure data transmitted from the different tires. As a result, it is possible to predict an abnormality in advance by comparing the pieces of the air pressure data of the individual tires even when the pieces of the air pressure data are not abnormal thus far.

As a yet further feature disclosed in the specification, there is provided an air pressure management device for a vehicle tire including: a vehicle tire supplied with electric power from an electret-vibration electric power generation unit, for detecting air pressure, and for wirelessly transmitting air pressure data obtained through detection to an outside; a processing unit for processing the air pressure data wirelessly transmitted from the vehicle tire; and a reception unit for receiving external data which is obtained by measuring the air pressure of the vehicle tire from the outside. This enables more reliable tire air pressure check. More specifically, the processing unit calibrates the air pressure data wirelessly transmitted from the vehicle tire according to the external data received by the reception unit. In this way, the reliability of the air pressure detection means in the vehicle tire may be maintained or increased according to the external data.

According to the technical features disclosed in the specification, the practical vehicle tire capable of outputting air pressure information and the practical air pressure management device for a vehicle tire are provided as described above.

Industrial applicability of the present invention is now described. The present invention provides the vehicle tire capable of outputting air pressure information, and the air pressure management device for a vehicle tire employing this vehicle tire.

While the description is given of the preferred embodiment of the present invention, the disclosed invention may be modified in various ways, and it is obvious to those skilled in the art that the present invention may take various forms of embodiments which are different from the specific structure described above. The following claims are thus intended to encompass any modifications of the present invention in the technical scope thereof without departing from the gist and the technical scope of the present invention.

What is claimed is:

1. A wireless communication device comprising:
an electric power generation unit;
an electric power accumulation unit for accumulating electric power generated by the electric power generation unit;
a sensor supplied with the electric power from the electric power accumulation unit to output sensed information;
a wireless communication unit supplied with the electric power from the electric power accumulation unit, for transmitting the sensed information outputted by the sensor to outside of the wireless communication device;
a control unit for causing at least one of the sensor and the wireless communication unit to suspend the function thereof until the electric power accumulated in the electric power accumulation unit becomes sufficient for the function of at least the one of the sensor and the wireless communication unit; and
a storage unit for storing the sensed information outputted by the sensor,
wherein the control unit causes the storage unit to store the sensed information outputted by the sensor, and the wireless communication unit to suspend the transmission until the electric power accumulated in the electric power accumulation unit becomes sufficient for the function of the wireless communication unit, and
wherein the control unit causes the sensor to output again sensed information if a predetermined period of time or longer has elapsed from a time of the output of the sensed information stored in the storage unit when the electric power accumulated in the electric power accumulation unit becomes sufficient for the function of the wireless communication unit.

2. A wireless communication device according to claim 1, wherein the control unit causes the wireless communication unit to transmit the sensed information without causing the sensor to output again the sensed information when a number of outputting the sensed information by the sensor exceeds a predetermined number, even if the predetermined period of time or longer has elapsed from a time of the output of latest sensed information stored in the storage unit.

3. A wireless communication device according to claim 1 wherein the control unit causes the sensor to suspend the function thereof while the electric power accumulated in the electric power accumulation unit is insufficient for the function of the sensor to output reliable sensed information.

4. A wireless communication device comprising:
an electric power generation unit;
an electric power accumulation unit for accumulating electric power generated by the electric power generation unit;
a sensor to output sensed information due to the electric power generated by the electric power generation unit;
a wireless communication unit supplied with the electric power generated by the electric power generation unit for transmitting the sensed information outputted by the sensor to outside of the wireless communication device;
a storage unit for storing the sensed information outputted by the sensor; and
a control unit for causing the sensor and the storage unit to start the outputting and storing functions even if the electric power accumulated in the electric power accumulation is in an insufficient level for the wireless communication unit to transmit the sensed information; and
wherein the control unit causes the sensor to output sensed information if a predetermined period of time or longer has elapsed from a time of the output of the sensed information stored in the storage unit when the electric power accumulated in the electric power accumulation unit becomes sufficient level.

* * * * *